Feb. 13, 1973 D. J. COHEN 3,716,701

ENCODED DATA CARD SYSTEM

Filed Nov. 9, 1970 2 Sheets-Sheet 1

Inventor
DAVID J. COHEN
By Irving Faber
Atty.

ENCODED DATA CARD SYSTEM

Filed Nov. 9, 1970 2 Sheets-Sheet 2

Inventor
DAVID J. COHEN
By Irving Faber
Atty.

United States Patent Office 3,716,701

Patented Feb. 13, 1973

3,716,701

ENCODED DATA CARD SYSTEM

David J. Cohen, 9614 N. Crawford, Skokie, Ill. 60604

Filed Nov. 9, 1970, Ser. No. 87,774
Int. Cl. G06k 7/08; G11b 25/04
U.S. Cl. 235—61.11 H 18 Claims

ABSTRACT OF THE DISCLOSURE

This invention relates to a high bit density encoded data card and code detector wherein the data is concealed from the observer thereof. The card comprises a thin metallic plate of a non-ferrous or ferrous material in which a plurality of holes are selectively placed. The code detector comprises a plurality of conductive squares or circles upon an insulated board; the holes of the card being selectively placed to correspond spacially with the conductors of the board. When an audio frequency voltage is applied in proximity to the card by means of a conductive plate placed thereon but insulated therefrom, voltage will be capacitively coupled only to those conductors of the board which are opposite the holes of the card.

BACKGROUND OF INVENTION

This invention relates to an improved encoded data card and an associated code detecting device and in particular it relates to a new, non-magnetic high bit density credit card system.

Credit cards over the past ten years have increasingly grown in use and today they form an integral part of the economy, not only of the United States, but the world Banks have mass mailed credit cards to millions of persons throughout the United States inducing greater use of the credit card. Prominent economists have forecasted that our economy in the future will be based almost, if not completely, on the extension of credit, the consumer being identified by means of an encoded card having a permanent identification number.

Credit cards have some basic problems both to the consumer and the businessman. Stolen credit cards can, and do cause millions of dollars in losses to consumer and businessman alike. If the card is lost or stolen, the consumer is responsible until the company issuing such card is notified. The banks who have issued credit cards en masse have sustained millions of dollars in losses because of stolen and lost cards through the mail.

Today the standard credit cards are embossed on a vinyl material. These cards are usually fabricated 55 at a time form a two foot by three foot sheet of opaque vinyl approximately 20 mils thick; on this sheet is printed the desired matter. The opaque sheet is then coated on each side with two pieces of clear vinyl approximately 5 mils thick; the clear vinyl being applied to the opaque vinyl by a press which applies the necessary pressure and heat simultaneously. The cards are then embossed. The embossed cards are capable of containing several bits of information; however, all of the bits of information are obvious to the holder thereof.

Another type of data card which is presently in use is the magnetic type card. A ferrous material is selectively deposited on a non-ferrous base and then covered with a vinyl or other similar material.

Another type of data card is of the digital class which is encoded by selectively depositing conductive material on a non-conductive base.

The latter two types of cards are usually for security systems wherein access to specific areas are limited. These cards are not capable of holding many "bits" of information and require a very expensive and complicated system for a readout or a clearance.

The existing encoded credit and security cards do not provide a card having the capability of concealing several bits of information, the specific information being known only by the holder thereof.

It is desirable both from a security and a credit card purpose to provide a card which is capable of holding a large quantity of information bits which are not exposed to the world to see or decipher.

The existing concealed encoded cards do not provide an easy inexpensive means for reading and for scanning the data card.

It is further desirable to provide an encoded data card which can be manufactured economically in large quantities and which has the information concealed thereby preventing unauthorized use thereof, and once the card is encoded it so remains permanently and will not undergo alteration due to prolonged usage.

The present invention not only provides for inexpensive mass produced encoded card capable of having concealed thereon a large quantity of information bits but provides for an inexpensive means to check or otherwise verify the data contained on the card. The invention, in general, incorporates the principal of capacitive coupling. One means of utilizing the principal of capacitive coupling is to selectively place conductive elements on the card. A second means utilizes selectively placed elements as shields which, when present, precludes capacitive coupling between elements of the reader. In either case the encoded digital configuration is incorporated on the card during manufacture.

SUMMARY OF THE INVENTION

The present invention incorporates the principal of capacitive coupling. A preferred embodiment of the invention uses a metal plate which is selectively punched to form the desired digital code. Another embodiment uses a dielectric base having a digital code imprinted on a card by means of copper etching. This latter embodiment may take the form of a printed circuit board. The basic plate containing the digital information is covered with a vinyl material on both sides, not only to conceal the information bits contained in the plate, but to give it rigidity and also enable any desirable embossing thereon, including the user's name. The concealed bits of information being the digital code concealed within the card is only known to the user and this can be readily verified by the readout or verifying system for said card.

The principal object of this invention is to provide a data card containing a large quantity of concealed information bits.

Another object of this invention is to provide a data card having concealed therein a large quantity of information bits which is inexpensive to manufacture.

A further object is to provide a security card which can be readily verified without the need of expensive readout equipment.

Still a further object is to provide a credit card having a concealed code imprinted therein which will not undergo change with prolonged use.

Still another object is to provide a high information bit density encoded card having means to be easily and readily verified.

Still another object is to provide a credit card obviating the need for embossing thereof, wherein the account number is encoded and may be electrically decoded and directly entered to an electric printer and/or a data processing system for checking credit.

DESCRIPTION OF PREFERRED EMBODIMENT

Figures 1, 2, 3, 4, 5, 6, 7, 8:
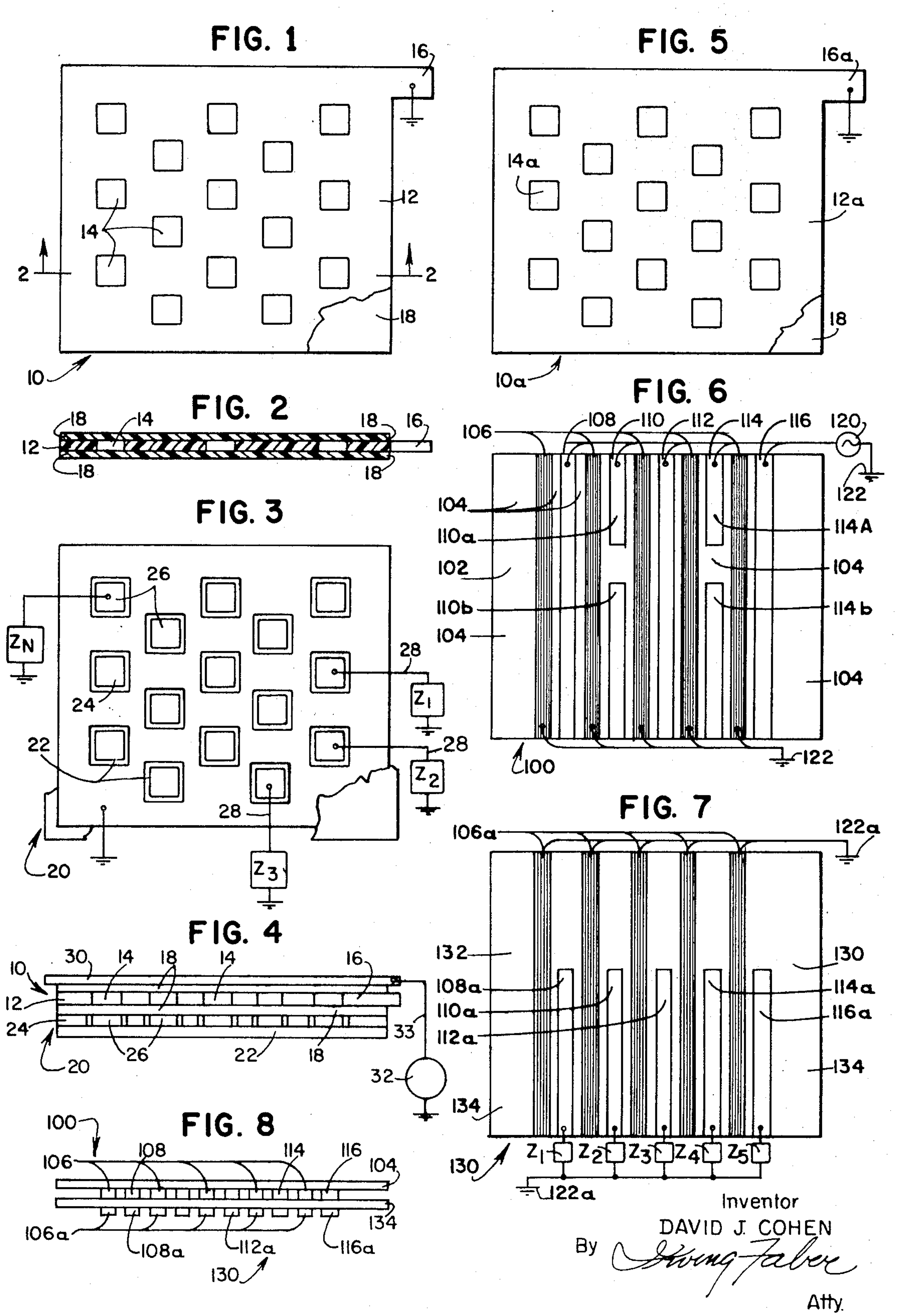
FIG. 1 illustrates a plan view of a high bit density encoded card without any surface covering.
FIG. 2 illustrates an enlarged cross section taken generally along 2—2 of FIG. 1 including a dielectric covering not illustrated in FIG. 1.
FIG. 3 illustrates a detector board for use with an encoded card.
FIG. 4 illustrates an enlarged edge view of the encoded card illustrated in FIG. 1 with the detector board illustrated in FIG. 3, in position for decoding.
FIG. 5 illustrates a copper etched encoded card corresponding to the embodiment of FIG. 1.
FIG. 6 illustrates a second embodiment of a copper etched encoded card.
FIG. 7 illustrates a detector board for use with the encoded data card illustrated in FIG. 6.
FIG. 8 illustrates an edge view of the encoded card illustrated in FIG. 6 with the detector board illustrated in FIG. 7, in position for decoding.

FIG. 1 illustrates a construction of an encoded card 10 having a high bit density. The encoded card illustrated in FIG. 1 utilizes the concept of capacitive coupling and comprises a thin metallic plate 12 of a non-ferrous conductor such as aluminum. However, it is understood that other conductive materials could be used. A plurality of holes 14 are punched out of the plate 12 to represent a specific code. A tab 16 extends from a corner of the encoded card 10 for connecting it to ground potential.

FIG. 2 illustrates an enlarged cross section taken generally along line 2—2 of FIG. 1 and includes a cross section of a dielectric material 18 which can be affixed to each side of the plate 12. The dielectric 18 is of a plastic or epoxy material and conceals the plate 12 and the code imprinted thereon; the tab 16 being left exposed.

FIG. 3 depicts a detector board 20 for use with the encoded card 10 illustrated in FIG. 1. The board 20 comprises an insulating material 22 to which copper 24 or other conductive material is clad to by means well known in the art. A plurality of rectangular conductors 26 are etched from the copper by means well known in the art. It is understood that geometrical shapes, other than rectangular, could be used and that this invention is not limited to rectangular shaped conductors or non-conductors. Each conductor 26 on the detector board 20 is coupled to a separate impedance Z by means of a shielded wire 28. There are as many impedances, $Z_N$ as there are conductors 26; impedances $Z_1$, $Z_2$, $Z_3$, and $Z_N$ only being illustrated to maintain clarity. Each impedance can feed a readout device for determining the correct identity of the user of the card.

FIG. 4 illustrates an enlarged edge view of the encoded card 10 in a position for a readout. A conductive plate 30 is connected to an audio-oscillator 32, said plate 30 being positioned on the encoded card 10; the face of the conductive plate 30 and the dielectric material 18 being adjacent one another. The plate 12 as hereinabove stated is grounded, shielding the detector board 20 from the oscillator potential 32. However, oscillator voltage will be capacitively coupled through the holes 14 of the plate 12 to corresponding conductors 26 of the detector board 20. Each hole 14 is punched in plate 12 to correspond to one of the conductors 26. The size of the holes 14 and the conductors 26 do not have to be the same. In fact, I have found that if the holes 14 of plate 12 are smaller than the conductors 26 of the detector board 20, cross coupling capacitance is reduced considerably. It is the number and position of the holes 14 in the plate 12 which determines the specific code.

FIG. 5 illustrates an encoded card **10*a* similar to the one illustrated in FIG. 1 having holes 14*a* etched from a copper clad plate 12*a* in lieu of punching holes 14 in the aluminum plate 12. I have kept the same designations for the card, plate and holes illustrated in FIG. 5 as used in FIG. 1 adding an alphabetical suffix thereto. In operation the copper clad plate 12*a* performs the same as the punched aluminum plate 12; the copper being clad to a base by means well known in the art and the holes being etched therefrom by well known techniques. Capacitive coupling occurs through the etched holes 14*a* to the conductors 26 of the board 20; the etched copper plate 12*a* being grounded, shields the oscillator voltage 32 from the detector board 20**. The specific code being determined by the number and positioning of the etched holes.

The plate 12 of FIG. 1 is easily and economically encoded with the use of standard techniques. The plate **12*a*** can be encoded using various standard techniques for fabricating printed-circuit boards.

I have also found that if the conductive plate 30 is made an integral part of this card and constructed of lead or lead alloy, the combination will yield an encoded card which is impervious to X-rays, inhibiting visual detection of the encoded card by means of X-ray.

Encoded tape can be manufactured by utilizing a punched tape of aluminum; the aluminum tape passing between the plate 30 and the detector board 20. This would result in a high speed tape reader system wherein the tape does not contact the reading means. It should further be noted that punched tapes fabricated in accordance with the above principles results in a more permanent record than is possible with paper tape since a metallic tape is more durable. Additional durability or security can be added by coating the punched aluminum tape with Mylar or other dielectric material.

The non-visible encoded cards described hereinabove have a high bit density in comparison to other non-visible encoding methods, such as magnetic encoding. The magnetic encoded card is capable of holding approximately 30 bits on a 3.375 inch by 2.125 inch credit card wherein the card illustrated in FIGS. 1, 5, 7 and 10 can hold between 60 to 70 bits in the same size card.

FIG. 6 illustrates an encoded data card 100 comprising a copper etched printed-circuit board 102. The printed circuit board 102 comprises a dielectric base 104 such as paperboard having etched thereon grounded copper conductors 106, and a plurality of copper conductors 108, 110, 112, 114, and 116. Each grounded copper conductor 106 is spacially positioned adjacent to each conductor so that alternating conductors are grounded. An oscillator 120 is connected to each of the conductive conductors 108 through 116 while the grounded conductors are connected to a ground designated numerically by the numeral 122. A typical encoded card as designated by the numeral 100 has overall dimensions of approximately 2⅛ inches x 3⅜ inches. The etched conductors, both grounded and ungrounded are of approximately one sixteenth (1/16) of an inch in width, thereby enabling a large number of conductors to be etched on a standard size encoded card. A code is placed on each encoded card by severing none, one, or more of the conductive conductors. FIG. 6 shows conductors 110 and 114 severed into two and each of said parts being respectively designated **110*a*, 110*b*, 114*a*, and 114*b*. The oscillator frequency voltage is not impressed upon the severed conductive conductors 110*b* and 114*b*; the dielectric 104 separating these conductors from the part of conductors 110*a* and 110*b* which are connected to the oscillator 120**. It is understood that the standard encoded card is suitable for having several alternating grounded and conductive conductors etched thereon; however, FIG. 6 only illustrates a few for clarity of illustration and description. I have found that an oscillator frequency between one (1) to ten (10) kHz. at an amplitude of approximately 30 volts will achieve the desired results; however, other frequencies and voltage amplitude may be used.

Figures 9, 10, 11, 12, 13, 14, 15:
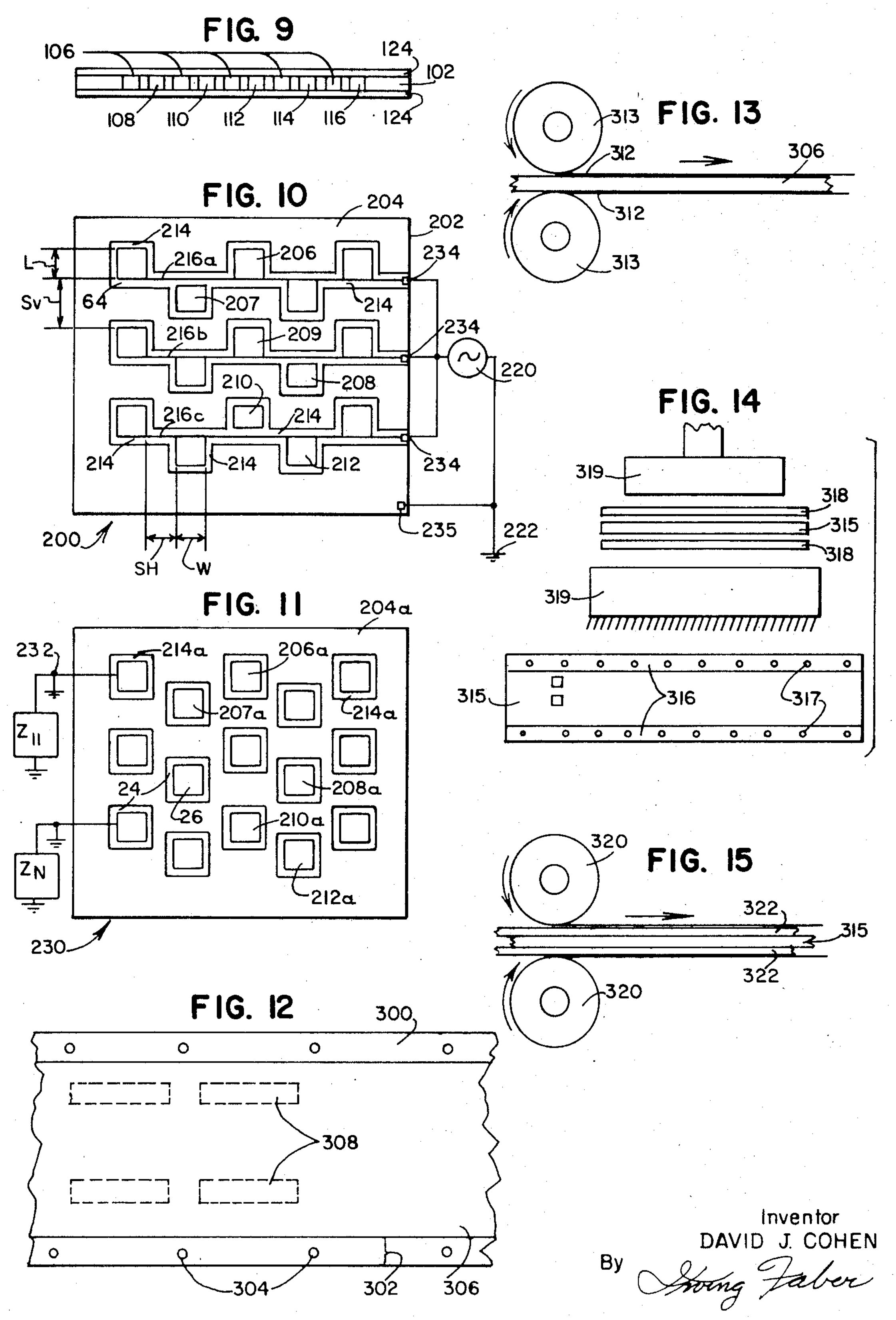
FIG. 9 illustrates an edge view of the encoded card of FIG. 6 having a plastic coating thereon.
FIG. 10 illustrates a third etched construction for an encoded card.
FIG. 11 illustrates a detector board for use with the encoded card illustrated in FIG. 10.
FIG. 12 illustrates a punched tape having adhesive paper over the punched metal.
FIG. 13 illustrates the lamination of Mylard sheets to the punched tape and adhesive paper combination.
FIG. 14 illustrates lamination of Mylar to the encoded card by means of a vertical press.
FIG. 15 illustrates a Mylar lamination apparatus for laminating Mylar to the encoded card.

A vinyl or similar type coating, 124 as illustrated in FIG. 9, may be placed on each side of the printed circuit board 102, by means well known in the art, thereby concealing the code to all but the holder thereof.

A detector board 130 for the above described encoded card is illustrated in FIG. 7 and comprises a copper etched printed circuit board 132 having a dielectric base 134 such as paperboard or other similar type dielectric. The detector board 130 has etched thereon a plurality of grounded conductors and conductors having the same numerical designations as the afore-described encoded card in FIG. 6 but different alphabetical suffixes to avoid confusion. The grounded conductors **106*a* are connected to a ground point designated by the numeral 122*a*. Each of the conductors 108*a*, 110*a*, 112*a*, 114*a*, and 116*a* do not run the full length of the board 130; however, if the said conductors ran the full length of the board 132 said conductors would be severed. The detector board has the same number of grounded and ungrounded conductors as the encoded card; the detector board also having the grounded conductors adjacent each of the ungrounded conductors but spaced therefrom. An impedance designated generally by $Z_1$, $Z_2$, $Z_3$, $Z_4$, $Z_N$ is coupled to one part of each of the ungrounded conductors; namely, $Z_1$ is coupled to 108*a*, $Z_2$ to 110*a*, $Z_3$ to 112*a*, $Z_4$ to 114*a*, and $Z_N$ to 116*a***. It is understood that an impedance would be coupled to each ungrounded conductor of the detector board as hereinabove described.

A vinyl or other similar type coating, not shown, may also be applied to each side of the printed detector board similar to the enclosed card. In such case, means for effecting edge connection to the board, common in the art, is required.

To obtain an electrical readout the encoded card 100 is positioned over the detector board 130 as illustrated in FIG. 8, said figure illustrating an edge view of the encoded card in position for a readout. The encoded card is placed directly over the detector board with the ungrounded conductors of corresponding numerical designations being in line with one another but not in physical contact therewith. When this is done impedances $Z_1$, $Z_3$, and $Z_N$ become capacitively coupled through the capacitative field established between the respectively associated ungrounded conductor pairs 108, **108*a*, 112, 112*a*, and 116, 116*a***.

With an oscillator providing a signal of 30 volts RMS at 1.2 kHz., the voltage measured across $Z_1$, $Z_3$, and $Z_N$ was approximately one volt RMS. The voltage measured across like impedances $Z_2$ and $Z_4$ was approximately two-tenths (0.2) volt RMS, a ratio of approximately 5 to 1. The lower voltage readings on $Z_2$ and $Z_4$ occurred due to ungrounded conductors 110 and 114 being severed as illustrated in FIG. 6, thereby the signal from the oscillator 120 not being impressed upon the conductors **110*b* and 114*b*, capacitive coupling could not occur to conductors 110*a* and 114*a*. The voltage that did occur across an impedance such as $Z_2$ was caused by cross-coupling capacitance between conductor pairs 108, 110*a*; and 112 and 110*a*. I also found that if the shielding conductors 106 on each side of conductor 110*a* were disconnected from ground potential and left "floating" then the voltage across $Z_2$ was approximately that which appeared across impedances $Z_1$ and $Z_3$. Likewise, if the grounded conductors 106*a* on each side of conductor 114*a* were disconnected from ground potential and left "floating" the voltage which appeared across $Z_4$ would be approximately the same voltage that appeared across impedances $Z_1$ and $Z_3$. It is therefore very important to use grounded shielding conductors 106*a* if a significant difference in voltage across impedances $Z_1$, $Z_3$, and $Z_N$ with respect to impedances $Z_2$ and $Z_4$ is to result. If a digital "0" is defined as a voltage of less than 0.4 volt RMS and digital "1" being defined as a voltage in excess of 0.8 volt, the encoded card illustrated in FIG. 6 represents the binary number "10101" reading from $Z_1$ to $Z_N$ respectively. The code can be varied by selectively severing the conductive conductors 108 through 116**.

The AC voltage output across impedances $Z_1$ through $Z_N$ are converted by means well known in the art to corresponding DC voltages as commonly used in digital data circuits.

In operation the holder of the encoded card informs the sales person of the special code number. The salesperson then takes the card 100 and places it on the detector or readout board 130. The oscillator 120 may be connected to the encoded card by a standard printed circuit board edge-connector resulting in output, which if the same as the number given by the user to the salesperson confirms that the user is the rightful holder of the card. If the readout number disagrees with the number given the salesperson, then they are put on notice that the person holding the card is not the owner of the card.

I further found that if conductors 110 and 114 were completely disconnected from the oscillator 120 in lieu of being severed as illustrated in FIG. 6, the voltages measured across $Z_2$ and $Z_4$ would even be less than the voltage measured when said conductors were severed. However, the same potential would appear across impedances $Z_1$, $Z_3$ and $Z_N$ since they would be connected to the oscillator as before. Disconnecting of the conductors from the oscillator 120 of selected conductors versus the severing thereof effects a greater voltage difference in relative value of the "1" and "0" voltages for digital readout.

FIG. 10 illustrates an encoded card 200 which can provide a greater density of encoded data than the card 100. The high density encoded card is comprised of a copper clad printed circuit board 202, the surface consisting almost entirely of solid copper 204. Etched from this copper surface are rectangular copper conductors 206, 207, 208, 210, 212, the remaining such copper conductors having no designations to maintain clarity of illustration and description. All of such copper rectangular conductors being of approximately the same size and having approximately the same conductivity. The rectangular conductors are isolated from the copper plate 204 by a dielectric insulating material 214 upon which all of the copper is clad. The rectangular conductors, such as those designated 206, 207, 208, 210, 212 are connected together by a thin copper conductor 216 when the card 200 is fabricated. The card 200 is encoded by selectively severing the rectangular copper conductors from the conductors **216*a*, 216*b* and 216*c* respectively. In FIG. 10 rectangular conductors 207, 208 and 210 are severed from conductors 216*a*, 216*b* and 216*c*** respectively, in accordance with the desired code.

An oscillator 220 is connected to conductors **216*a*, 216*b* and 216*c*; the other side of the oscillator is connected to a ground 222, the copper base 204 also being connected to the ground 222**.

FIG. 11 depicts a code detector board 230 for use with the encoded card 200 illustrated in FIG. 10. The board 230 is also an etched copper clad printed circuit board and is almost identically etched as the card 200, except the conductors 216 are deleted. The board is also similar to the detector board 20 illustrated in FIG. 3.

The corresponding conductors etched on the board 230, have the same designation as those on the board 200 with the addition of the suffix "*a*" and each of the conductors on board 230 are isolated from one another and the copper sheet **204*a* by the insulated board 214*a*** on which the conductors are clad.

To all of the conductors **206*a*, 207*a*, 208*a*, 212*a*** on the board 230 are connected a separate impedance such as $Z_{11}$ through $Z_N$ a shielded wire 232. All of the impedances connected to the conductors of the detector board 230 are also returned to ground potential. To obtain a readout, the encoded card of FIG. 10 is placed directly over the top of the detector board 230 of FIG. 11; the rectangular conductors of similar numerical designation being opposite each other. The encoded card is connected to the oscillator 220 by means of tabs 234 and 235 placing all of the rectangular conductors connected to conductors 216*a*, 216*b* and 216*c* at oscillator potential. The rectangular conductors of the card 200 to which the oscillator voltage is connected will be capacitively coupled to the corresponding conductor on the detector board 230 inducing a voltage across the impedance connected to the conductor on the detector board. The conductors on the detector board opposite conductors on the card 200 which are not coupled to the oscillator voltage theoretically should have no voltage induced across its associated impedance; however, cross coupling may induce a small voltage across the impedance which is significantly smaller than the voltage induced by capacitive coupling of opposite conductors of the card 200 and the detector 230.

The dimensions of the standard credit card are approximately 2 inches by 3 inches and with conductors of the following dimensions, L=0.2 inch, W=0.1 inch; the spacing would be $S_V$=0.2 inch and $S_H$=0.1 inch. The use of such dimensions and spacing would enable 75 bits of information to be encoded onto a standard credit card; this being considerably more than the 20 to 30 bit maximum of other type of concealed encoded cards. The encoded card 200 and detector 230 may be covered with a dielectric material such as vinyl plastic or other similar material, however the terminals 234 and 235 would not be covered to enable the oscillator to be connected thereto.

An important feature of the encoded card described in this patent application is the fact that it may be economically manufactured on a large or small scale basis.

The basic construction of a typical card of a preferred embodiment is as follows: The heart of the encoded card is a metal plate with some degree of springiness or resiliency. This plate should be non-ferrous, if the card is not to be decoded as readily as a magnetic type card. Therefore, for maximum security, the production card should not consist of ferrous material. The materials to be considered are aluminum and spring tempered brass or bronze. Aluminum is the cheapest material and bronze is the most expensive. The latter materials will provide more strength and resiliency than aluminum. However, the added strength and resiliency may not be necessary as will be described later on.

The metal plate will form the center of a plastic laminated card. If plastic is used, the type of plastic will be a vinyl plastic or Mylar with a thermoplastic adhesive coating. The latter material adheres extremely well to paper or metal.

Since the type of credit cards described in this application require the addition of a metal insert, each with different encoding, the methods for manufacturing standard credit cards are not sufficient.

Two methods for fabricating the encoded card described herein are now described.

Method I

Step 1: In FIG. 12*a* metal sheet 300, 10 to 20 mils thick and 10 feet long x 1.5 feet wide is punched on a numerical-control punch press. Each individual punched code is readily programmed on the control tape of the numerical control machine. Hnce, a sheet providing approximately 7 inserts along its width by 30 along its length or 210 encoded cards can be automatically punched in one operation with each punched hole precisely located. This assumes that a standard credit card size of 2⅛ inches x 3⅜ inches is used. Along the entire length near each edge of the metal sheet will be punched a plurality of guide holes 304.

Step 2: The punched metal sheet 300 is then covered with 8½ inch wide x 11 inch long sheets of adhesive backed paper 306 leaving a ½ inch metal border 302 on each edge. This paper may be printed with any non-confidential information. It is important that these sheets of paper be properly registered with respect to their placement upon the metal sheet.

Step 3: The combination metal sheet 300 and adhesive packed paper 306 may then be laminated with two 10 mil thick by 17 inch wide sheets of clear Mylar 312 passing through an 18 inch laminating machine common in the art, which essentially consists of a pair of rollers 313, illustrated in FIG. 13, which simultaneously apply heat and pressure to the assembly as described above. The Mylar sheets are not laminated over the border 302 of the combination metal sheet 300 and paper backing 306.

Step 4: The entire 1.5 foot x 10 foot laminated assembly is now cluster-punched (7 cards at a time), the assembly being advanced lengthwise and positioned in successive guide holes 304 prior to each punching operation. The outline of the punched cards is defined by the dotted lines 308 as in FIG. 12.

Step 5: If desired each card may now also be embossed for use with standard imprinters.

Method II

It should be noted that vinyl plastic may be used instead of the Mylar sheet, and if such is the case, it is more advantageous to use a vertical press well known in the art which not only provides heat and pressure, but must also provide cooling of the laminated cards while they are under pressure. This latter method of lamination is more complicated and usually has more advantages where large single sheets of material are to be laminated in very large quantity.

Step 1: A metal sheet 315 of approximately 10 mils thick and 3 feet long by 2 feet wide is punched on a numerical control punch press. Each individual punched code is readily programmed on a control tape of the numerical control machine. Such a metal sheet can provide approximately 55 encoded metal inserts for standard size credit cards, in a single operation, with each punch hole precisely located. A border 316 is provided along each edge of this metal sheet, and runs the entire length of this sheet. At spaced intervals along these borders guide holes 317 are also numerically punched.

Step 2: Two 23 inch x 36 inch sheets 318 of opaque vinyl approximately 10 mils thick and printed repetitively with the desired card identification are then placed on each side of the metal sheet 315 leaving a border of approximately ½ inch on each side, along the length dimension of the metal sheet.

Step 3(A): The two sheets of opaque vinyl surrounding the metal insert are then placed in a vertical press 319 as used in fabricating standard vinyl type credit cards. The press 319 is brought down vertically applying heat and pressure, thereby laminating the metal insert between the two sheets of opaque vinyl.

Step 3(B): As an alternate to step 3(A) above, rollers 320 similar to those used in step 3 of method 1 may be used instead of a vertical press. In such case opaque Mylar 322 instead of opaque vinyl would be used, and the metal sheet 315 surrounded by 2 sheets of the opaque Mylar 322 would then be passsed between the rollers 320 which simultaneously apply heat and pressure to the Mylar and metal sheet.

Step 4(A): Following step 3(A) above, 2 sheets of clear vinyl approximately 3 to 5 mils thick are then placed on each side of the laminated assembly of FIG. 14. The vertical press is again brought down resulting in a completed laminated assembly.

Step 4(B): Following step 3(B) above, 2 sheets of clear Mylar about 2 mils thick are then placed on each side of the laminated assembly of FIG. 15. This new assembly is passed through the rollers 320 thereby resulting in a completed laminated assembly.

Step 5: The completed laminated assembly is then accurately punched using the guide holes described above to precisely cut out individual encoded cards.

It should also be noted that the type of cards as fabricated above will have metal edges exposed on four sides, and that an appropriate card reader, which can effect electrical connection to the edge of the metal insert, is necessary. Any of the edges of the laminated card may be connected to this reader.

It should be noted that the type of card fabricated by Method II described above, is more secure than that of Method I since the layers of vinyl enclosing the punched metal insert are fused together through the punched holes thereof. This same degree of security is attained in other types of cards only by making the inserts thereof somewhat smaller than the overall credit card size, thereby enabling a border of only Mylar around all edges of the insert. A card containing a border consisting of only two sheets of laminated Mylar becomes virtually impossible to open or pry apart without destroying the Mylar film and the laminated contents. However, if maximum data density is required on an encoded card this latter method may not be desirable since less area of the encoded insert is available. It is, therefore, seen that the specific type of card to be fabricated may be highly dependent upon the amount of security required versus the bit density required. In either case a trade-off is necessary. It should also be noted that to fabricate a card, as disclosed herein with plastic borders only, the assembly must first be punched to the desired insert size, and each of these inserts in turn individually punched and laminated (at greater expense).

As a final step to either Method I or II, a readout system placed at the end of the production line can be used to test and identify each card. This readout system can operate an electrically operated digital printer.

A hard-tempered aluminum will provide a sufficiently strong card, particularly with the additional support provided by the two 10 mil sheets of plastic film. The strength inherent with the brass or bronze should not be sufficiently beneficial for high volume applications, in view of the added material cost involved. Using aluminum, a metal insert will cost about one cent, whereas using brass the cost would be about six cents.

The detector board and associated impedances $Z_{11}$ through $Z_N$ of FIG. 11 constitutes a basic card reader which provides an A.C. binary coded output. Since most data processing equipment operates from D.C. logic levels, it is necessary to convert the A.C. voltages to corresponding D.C. voltages. This conversion is achieved by means well known in the art. Each encoded bit requires an output circuit and each impedance $Z_{11}$ through $Z_N$ is connected to such an output circuit. The output circuit comprises an A.C. amplifier for boosting the detector board output voltage which in turn is connected to an A.C./D.C. converter, the D.C. output of which is fed to a D.C. level detector. When the D.C. output is below a predetermined level, the level detector output will be at one D.C. voltage value, and when the output signal from the A.C. to D.C. converter is above the predetermined level, the output of the level detector will switch to a second D.C. voltage level.

In practice, a user will present his encoded card to a salesperson, clerk, or other such person who would insert the encoded card onto the card code detector as previously described herein. The user would have to know his specific number (referred to hereinafter as the "verifying number") encoded in the encoded card as described herein. The salesperson, clerk, etc. would depress push-buttons or similar type switches to correspond to that number which would result in a digital code which could be electrically stored. If this stored code matched that encoded on the particular card, a corresponding electrical output would result. This output can operate a light and/or initiate a particular occurrence such as opening a door if the card were used to gain access to security areas.

It is understood that wherever the term audio oscillator is used hereinabove, that various other alternating current sources may be used equally well.

The encoded data card and associated detector as discussed hereinabove constitute an encoded data card system.

The encoded cards herein described do not need any identification written or embossed thereon. If required, only the person's name and signature may be printed on the card. If such a card were found or stolen, the new possessor thereof would be hard pressed to use the card. A central mailing address might be printed on the card to facilitate its return to the rightful owner. The aforesaid systems are valuable for use in restaurants, airline terminals and other establishments employing credit card systems providing an open line of credit. However, more sophisticated systems which also provide a credit check subsequent to verification are also possible if the credit card number is encoded in the card. In such case it is essential that a high bit density be used.

It is believed that the invention has been described in such detail as to enable those skilled in the art to understand the same, and it will be appreciated that variations or modifications may be made without departing from the spirit and scope of the invention.

What is desired to secure by Letters Patent in the United States is:

1. An encoded data card system the system comprising:
- an encoded data card having a base plate and a plurality of information bits selectively positioned on said base plate, said information bits selectively defining a code;
- a detector means having a first and second plate, said plates being opposite and parallel one another and being positioned to define a space between said first and second plate to enable the encoded data card to be positioned therebetween, said first plate being uniformly conductive; and
- a dielectric material separating the information bits from the first and second plates of the detector means.

2. An encoded data card system as defined in claim 1 wherein the base plate of the encoded data card is of a conductive material and said information bits are apertures through said base plate.

3. An encoded data card system as defined in claim 2 wherein said encoded data card system further comprises:
- means for coupling said base plate to a ground potential.

4. An encoded data card system as defined in claim 3 wherein the first plate of the detector means has means for coupling thereto an alternating current source.

5. An encoded data card system as defined in claim 2 wherein said conductive material for the base plate of the encoded data card is metallic.

6. An encoded data card system as defined in claim 3 wherein said second plate of the detecting means comprises:
- a dielectric base having conductors positioned thereon, said conductors having a predetermined configuration corresponding to the information bits of the encoded card; and
- means for transmitting electrical data through said encoded data card to said second plate of the detecting means.

7. An encoded card system as defined in claim 6 wherein said detecting means further comprises:
- an impedance coupled to each of said conductors, said impedance being a voltage detecting device.

8. An encoded data card system as defined in claim 7 wherein the means for transmitting electrical data through the encoded data card to the detecting means comprises:

electrically coupling said information bits and detecting means capacitively by positioning the card over the detecting means whereby the information bits in said encoded card are positioned over corresponding conductors of the detecting means, a larger current being transmitted through each of said information bits to its corresponding detector conductor than where there is no information bit opposite a detector conductor.

9. An encoded data card system, comprising:

an encoded data card having a dielectric base plate and a plurality of information bits selectively positioned on said base plate, said information bits selectively defining a code;

a detector means having a plate opposite one face of the encoded data card;

wherein said information bits are a plurality of conductors spaced from one another, the dielectric being interposed adjacent each conductor.

10. An encoded data card as defined in claim 9 wherein alternating conductors are connected to a ground potential.

11. An encoded data card system as defined in claim 10 wherein each conductor interposed between said grounded conductors are connected to an alternating current source; and wherein said code is generated by selectively severing predetermined conductors to said alternating current source.

12. An encoded data card system as defined in claim 11 wherein the detector means comprises:

a dielectric plate having a plurality of copper conductors positioned thereon and spaced from one another, the dielectric plate being interposed between each conductor and said conductors corresponding to the conductors of the encoded card.

13. An encoded data card system as defined in claim 12 wherein the detecting means further comprises:

an impedance coupled to alternating conductors, said impedance being a voltage detecting device; and wherein the conductors adjacent said alternating conductors are coupled to ground.

14. An encoded data card system as defined in claim 13 wherein the means for transmitting electrical data from the encoded data card to the detecting means, comprises:

electrically coupling said encoded data card and detecting means capacitively by positioning the card over the detecting means whereby the non-grounded conductors in said data card are positioned over corresponding conductors of the detecting means, said capacitive coupling causing a larger current to be transmitted through said conductors not severed than the severed conductors.

15. An encoded data card system as defined in claim 9 wherein said encoded data card further comprises:

a plurality of copper conductors positioned on the dielectric base plate; and an alternating current source connected to said conductors, wherein said code is generated by selectively severing conductors from said current source.

16. An encoded data card system as defined in claim 15 wherein said means for detecting said code comprises:

a dielectric base plate having conductors positioned thereon corresponding to the information bits of the encoded card; and means for transmitting electrical data from said encoded card to said detecting means.

17. An encoded data card system as defined in claim 16 wherein said detecting means further comprises:

an impedance coupled to each of said conductors, said impedance being a voltage detecting device.

18. An encoded data card system as defined in claim 17 wherein the means for transmitting electrical data from the encoded data card to the detecting means comprises:

electrically coupling said information bits and detecting means capacitively by positioning the card over the detecting means whereby the information bits of said data card are positioned over corresponding conductors of the detecting means, said capacitive coupling causing a larger current to be transmitted from said conductors not severed than from the severed conductors.

References Cited

UNITED STATES PATENTS

| | | | |
|---|---|---|---|
| 3,376,559 | 4/1968 | Junji Yamato et al. | 235—61.11 H |
| 3,397,393 | 8/1968 | Palmateer | 235—61.11 H |
| 3,404,382 | 10/1968 | Rosenheck et al. | 235—61.11 H |
| 3,585,368 | 6/1971 | Nunamaker | 235—61.11 H |

DARYL W. COOK, Primary Examiner

U.S. Cl. X.R.

340—173 CA